(12) United States Patent
Mohanty et al.

(10) Patent No.: US 8,351,848 B2
(45) Date of Patent: Jan. 8, 2013

(54) DEVICE, SYSTEM AND METHOD OF POWER-SAVING FOR WIRELESS COMMUNICATION

(75) Inventors: Shantidev Mohanty, Santa Clara, CA (US); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 349 days.

(21) Appl. No.: 12/645,502

(22) Filed: Dec. 23, 2009

(65) Prior Publication Data

US 2011/0045763 A1 Feb. 24, 2011

Related U.S. Application Data

(60) Provisional application No. 61/275,266, filed on Aug. 24, 2009.

(51) Int. Cl.
*H04B 7/15* (2006.01)
(52) U.S. Cl. ............. 455/11.1; 455/13.1; 455/16
(58) Field of Classification Search ........... 455/3.02, 455/427, 428, 430, 431, 7–9, 11.1, 12.1, 455/13.1–13.3, 14–17, 522, 68–70, 127.1, 455/343.1–343.6, 117, 230, 298, 572, 574, 455/327; 340/425.1; 370/226, 293, 246, 370/279, 315, 316, 492, 501, 318
See application file for complete search history.

(56) References Cited

U.S. PATENT DOCUMENTS

| | | | | |
|---|---|---|---|---|
| 4,509,109 A | * | 4/1985 | Hansen | ............ 363/126 |
| 4,577,315 A | * | 3/1986 | Otsuka | ............ 370/311 |
| 4,794,649 A | * | 12/1988 | Fujiwara | ............ 455/9 |
| 7,688,772 B2 | * | 3/2010 | Sinivaara et al. | ............ 370/318 |
| 2002/0193080 A1 | * | 12/2002 | Komsi et al. | ............ 455/90 |
| 2005/0122233 A1 | * | 6/2005 | Isoyama et al. | ............ 340/870.11 |
| 2005/0286466 A1 | * | 12/2005 | Tagg et al. | ............ 370/329 |
| 2007/0191031 A1 | * | 8/2007 | Mohanty et al. | ............ 455/458 |
| 2008/0014921 A1 | * | 1/2008 | Venkatachalam | ............ 455/425 |

(Continued)

FOREIGN PATENT DOCUMENTS
EP 0 245 024 B1 11/1987

OTHER PUBLICATIONS

IEEE Standard for Local and metropolitan area networks Part 16: Air Interface for Broadband Wireless Access Systems Amendment 1: Multihop Relay Specification; IEEE Computer Society and the IEEE Microwave Theory and Techniques Society Sponsored by the LAN/MAN Standards Committee; IEEE Std 802.16j™-2009 (Amendment to IEEE Std 802.16-2009).

(Continued)

*Primary Examiner* — Dominic E Rego
(74) *Attorney, Agent, or Firm* — Shichrur & Co.

(57) ABSTRACT

Some demonstrative embodiments include devices, systems and/or methods of managing power saving mechanisms of wireless communication devices. For example, a wireless communication unit may relay communications between a wireless communication device and a base station, wherein the wireless communication unit is to manage a power-saving mechanism of the wireless communication device by scheduling one or more power-save periods for the wireless communication device, and transmitting to the wireless communication device a power-save message indicating the one or more power-save periods. Other embodiments are described and claimed.

19 Claims, 3 Drawing Sheets

U.S. PATENT DOCUMENTS

| | | | |
|---|---|---|---|
| 2008/0031174 A1* | 2/2008 | Saifullah et al. | 370/311 |
| 2008/0242341 A1 | 10/2008 | Wu et al. | |
| 2009/0036050 A1 | 2/2009 | Min et al. | |
| 2009/0073915 A1* | 3/2009 | Zhang et al. | 370/315 |
| 2009/0279474 A1* | 11/2009 | Chou et al. | 370/315 |
| 2010/0135195 A1* | 6/2010 | Sakoda | 370/311 |

OTHER PUBLICATIONS

Search Report for PCT/US2010/046374 mailed on Apr. 20, 2011.
International Preliminary Report on Patentability Received for PCT Patent Application No. PCT/US2010/046374, Mailed on Mar. 8, 2012, 7 pages.

* cited by examiner

DEVICE, SYSTEM AND METHOD OF POWER-SAVING FOR WIRELESS COMMUNICATION

CROSS REFERENCE

This application claims the benefit of and priority from U.S. Provisional Patent application No. 61/275,266, entitled "Advanced broadband wireless communication systems and methods", filed Aug. 24, 2009, the entire disclosure of which is incorporated herein by reference.

BACKGROUND

Wireless communication systems usually include one or more wireless communication devices communicating with a network coordinator, e.g., a Base Station (BS).

Occasionally, due to limitations, e.g., physical limitations such as distance, and/or in order to improve system performance, a system may also include one or more relay stations to mediate between one or more wireless communication devices and the BS.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
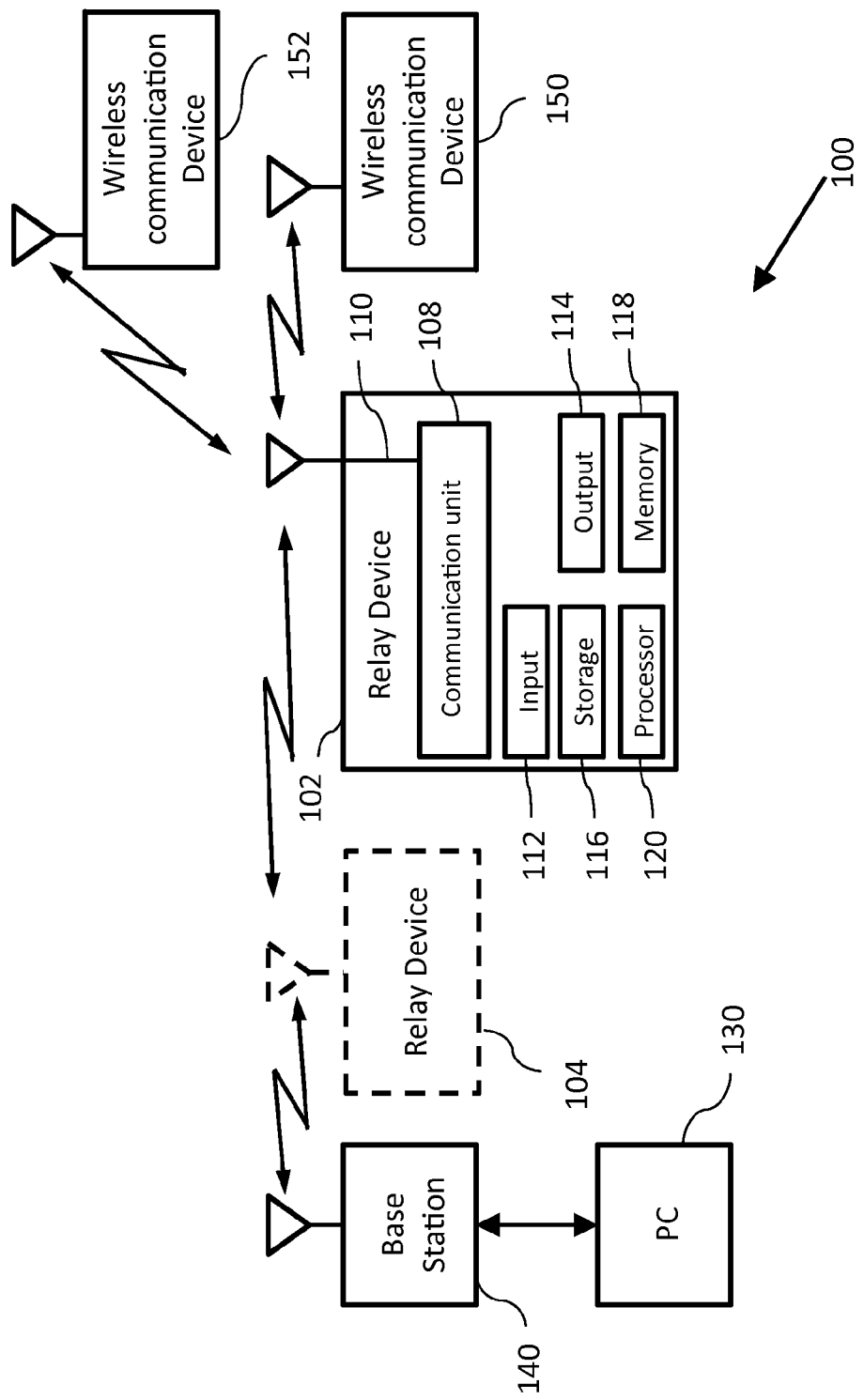
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The terms "power save" and "power save mode" as used herein may refer, for example, to reducing, diminishing, shutting down, powering off, turning off and/or switching off the electrical current to a device and/or component, and/or to switching the device and/or component to operate at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

The terms "regular power" and "regular power mode" as used herein may refer, for example, to any operating mode enabling full reception and/or normal operation of a device and/or component, e.g., for full reception, handling, decoding, transmitting and/or processing of wireless communication signals.

The term "sleep mode", as used herein with reference to a wireless communication device, may refer, for example, to any suitable power save mode, at which the wireless communication device may be unavailable, e.g., for receiving and/or transmitting wireless transmissions, during one or more periods ("sleep periods" or "sleep cycles"), while maintaining, during the sleep cycles, a registration of the wireless communication device with another wireless device, e.g., a base station and/or a relay station, for example, enabling the wireless communication device to receive transmissions, e.g., downlink broadcast traffic, during one or more predefined intervals ("listening intervals") within the sleep cycle. In one embodiment, the sleep mode may include the sleep mode as defined by *IEEE 802.16-2009: Air Interface for Fixed and Mobile Broadband Wireless Access System* and/or future versions and/or derivatives thereof ("the IEEE 802.16 standards"), and the like.

The term "idle mode", as used herein with reference to a wireless communication device, may refer, for example, to any suitable power save mode, at which the wireless communication device may be unavailable, e.g., for receiving and/or transmitting wireless transmissions, during one or more periods ("idle periods" or "paging cycles"), while not being registered, during the idle mode, with another wireless communication device, e.g., BS and/or relay device, and while being able to receive, during the paging cycle downlink broadcast traffic, e.g., during on or more predefined intervals ("paging periods", "paging intervals" or "paging available intervals") within the paging cycle. The idle mode may allow greater power savings, e.g., compared to the sleep mode, and/or the paging cycle may be longer, e.g., compared to the sleep cycle. In one embodiment, the idle mode may include the idle mode as defined by the IEEE 802.16 standards, and the like.

Some embodiments may be used in conjunction with various devices and systems, for example, a Personal Computer, a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing IEEE 802.11 (*IEEE 802.11-1999: Wireless LAN Medium Access Control (MAC) and Physical Layer (PHY) Specifications*), 802.11a, 802.11b, 802.11g, 802.11h, 802.11j, 802.11n ("the IEEE 802.11 standards"), the IEEE 802.16 standards, and/or future versions and/or derivatives thereof, devices and/or networks operating in accordance with existing Wireless-Gigabit-Alliance (WGA) and/or WirelessHD™ specifications and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some demonstrative embodiments may be used in conjunction with suitable limited-range or short-range wireless communication networks, for example, a wireless area network, a "piconet", a WPAN, a WVAN and the like.

Reference is now made to FIG. 1, which schematically illustrates a block diagram of a system 100 in accordance with some demonstrative embodiments.

As shown in FIG. 1, in some demonstrative embodiments, system 100 may include a wireless area network and/or a Basic Service Set (BSS) including one or more wireless communication devices capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, system 100 may include at least one relay device (also referred to as "relay station"), e.g., relay devices 102 and/or 104, to relay wireless communications between at least one base station (BS), e.g., BS 140, and one or more wireless communication devices, e.g., devices 150, and 152.

In some demonstrative embodiments, wireless communication devices 150 and/or 152, relay devices 102 and/or 104, and/or base station 140 may include, for example, a personal computer, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile Personal Computer (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, relay devices 102 and/or 104 may include a wireless communication unit 108 to communicate with other wireless communication devices or stations of system 100, e.g., as described below. Relay devices 102 and/or 104 may also include, for example, one or more of a processor 120, an input unit 112, an output unit 114, a memory unit 118, and a storage unit 116. Relay device 102 may optionally include other suitable hardware components and/or software components.

In some demonstrative embodiments, some or all of the components of relay devices 102 and/or 104 may be enclosed in a common housing or packaging, and may be interconnected or operably associated using one or more wired or wireless links. In other embodiments, components of wireless communication devices 150 and/or 152; of relay devices 102 and/or 104; and of base station 140 may be distributed among multiple or separate devices.

Processor 120 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 120 executes instructions, for example, of an Operating System (OS) of relay device 102, and/or of one or more suitable applications.

Input unit 112 includes, for example, a keyboard, a keypad, a mouse, a touch-pad, a track-ball, a stylus, a microphone, or other suitable pointing device or input device.

Output unit 114 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 118 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 116 includes, for example, a hard disk drive, a floppy disk drive, a Compact Disk (CD) drive, a ROM drive, a DVD drive, or other suitable removable or non-removable storage units. Memory unit 118 and/or storage unit 116, for example, may store data processed by relay device 102.

In some demonstrative embodiments, wireless communication unit 108 includes, for example, one or more wireless transmitters, receivers and/or transceivers able to send and/or receive wireless communication signals, RF signals, frames, blocks, transmission streams, packets, messages, data items, and/or data. For example, wireless communication unit 108 may include or may be implemented as part of a wireless Network Interface Card (NIC), and the like.

Wireless communication unit 108 may include, or may be associated with, one or more antennas or one or more sets of antennae 110. Antennae 110 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some demonstrative embodiments, system 100 may include a single relay device, e.g., relay device 102, to directly relay communications between BS 140 and wireless communication devices 150 and/or 152. For example, relay device 102 may receive an uplink transmission directly from wireless communication device 150 and directly transmit the transmission to base station 140; and/or relay device 102 may receive a downlink transmission directly from base station 140 and directly transmit the transmission to wireless communication device 150.

In some demonstrative embodiments, system 100 may include a sequence of a plurality of relay devices, e.g., relay devices 102 and 104, to sequentially relay communications between BS 140 and wireless communication device 150 and/or 152. For example, as illustrated in FIG. 1, relay device 102 may be in direct communication with wireless communication devices 150 and/or 152, while relay device 102 may communicate with BS 140 via relay device 104. For example, relay device 102 may receive an uplink transmission directly from wireless communication device 150, and transfer the transmission to relay device 104, which in turn may transfer the transmission to base station 140; and/or relay device 104 may receive a downlink transmission directly from BS 140, and transfer the transmission to relay device 102, which in turn may transfer the transmission to wireless communication device 150.

In some demonstrative embodiments, system 100 may implement a power-saving mechanism to switch between one or more power-saving modes at wireless communication devices 150 and/or 152, e.g., as described below.

In some demonstrative embodiments, the power saving mechanism may include at least one power save mode, e.g., a sleep mode and/or an idle mode. For example, wireless communication devices 150 and/or 152 may be capable of switching between a regular power mode, and idle mode and/or a sleep mode, e.g., according to the 802.11 and/or 802.16 standards, and the like.

In some demonstrative embodiments, managing the power-saving mechanism of one or more wireless communication devices, e.g., wireless communication devices 150 and/or 152, at a relay device, e.g., relay device 102, may reduce a latency associated with scheduling the power-save periods and/or exchanging one or more messages between the BS, the relay device, and the one or more wireless communication devices. For example, managing the power saving mechanism at BS 140 may result in latency, for example, due to the fact that power-saving messages exchanged between wireless communication device 150 and BS 140 may need to first get through relay devices 102 and/or 104. The latency may substantially increase as more relay devices are incorporated between BS 140 and wireless communication device 150. Reduction of latency time may especially be important for real time traffic, e.g., video and/or voice-over Internet Protocol (VoIP) traffic.

In some demonstrative embodiments, managing the power-saving mechanism of wireless communication devices 150 and/or 152 at relay device 102 may reduce the latency associated with scheduling the power-save periods and/or exchanging one or more messages between BS 140, one or more relay devices 102 and/or 104, and/or wireless communication devices 150 and/or 152.

In some demonstrative embodiments, if two or more relay devices are implemented in system 100, the relay device being in direct communication with the wireless communication device, e.g., the relay device being most proximate or closest to the wireless communication device, may manage the power-saving mechanism of the wireless communication device. For example, relay device 102, which is in direct communication with wireless communication device 150, may manage the power-saving mechanism of wireless communication device 150.

In some demonstrative embodiments, wireless communication unit 108 may manage the power-saving mechanism of one or more wireless communication devices, e.g., devices 150 and/or 152, by scheduling one or more power-save periods for the wireless communication devices. For example, relay device 102 may manage the power-saving mechanism of wireless communication devices 150 and/or 152 by scheduling one or more sleep mode periods and/or idle mode periods for wireless communication devices 150 and/or 152, e.g., as described below.

In some demonstrative embodiments, wireless communication unit 108 may receive a power-save request from one or more wireless communication devices of system 100 ("the requesting device"), e.g., devices 150 and/or 152. The power-save request may include, for example, a suitable packet, frame, transmission, Power-Save Multi Poll (PSMP) or any type of messaging format capable of notifying relay device 102 of a desired and/or requested power-save mode to be scheduled.

In some demonstrative embodiments, wireless communication unit 108 may schedule one or more power save periods ("the scheduled power-save periods") for the requesting device. For example, wireless communication unit 108 may schedule the power-save periods for wireless communication device 150 based on the power-save request received from wireless communication device 150. For example, wireless communication unit 108 may process the power-save request and determine whether or not to schedule the power-save periods according to the power-save request ("to accept the power save request") or to reject and/or "partially" accept the power-save request while using a configuration that is different from a power save configuration included in the power saver request. For example wireless communication unit 108 may not schedule any power-save periods and/or may schedule one or more power-save periods having a configuration different from the configuration of the power-save periods of the power-save request, e.g. by scheduling a sleep operation of a wireless communication device using a sleep cycle duration, which is different from a sleep cycle duration requested in the power save request message received from the wireless communication device. In one embodiment, wireless communication unit 108 may reject the power save request and schedule to wireless communication device 150 one or more alternative power-save periods, different from the power-save periods of the power-save request.

In some demonstrative embodiments, wireless communication unit 108 may transmit a power save response to the requesting device indicating the scheduled power save periods during which the requesting wireless communication device is to operate at the power save mode. For example, wireless communication unit 108 may receive the power save request from wireless communication device 150, schedule power save periods for wireless communication device 150 and transmit a power save response to wireless communication device 150.

In some embodiments, e.g., as described above, wireless communication unit 108 may schedule the power-save periods for a wireless communication device, e.g., wireless communication device 150, based on a power-save request from the wireless communication device. However, in other embodiments, wireless communication unit 108 may schedule the power save periods for a wireless communication device, e.g., wireless communication device 150, based on any other suitable criterion, e.g., which does not utilize or require a power-save request.

In some demonstrative embodiments, wireless communication unit 108 may transmit a power-save update to base station 140, e.g., before, during or after transmitting the response to wireless communication device 150. The power-save update may indicate the one or more power-save periods assigned to the wireless communication devices by wireless communication unit 108. In some demonstrative embodiments and depending on network policy, upon receiving the power-save update from wireless communication unit 108, base station 140 may use appropriate flow control for pending data traffic corresponding to relay device 102 and/or wireless communication device 150, e.g., to avoid overflow of buffers of relay device 102.

In some demonstrative embodiments, wireless communication device 150 may receive the response from wireless communication unit 108, and may switch to the power save mode during one or more of the scheduled power-save periods.

In one example, wireless communication device 150 may transmit a power save request, to switch to power mode beginning at a certain time, e.g., within 5 milliseconds (ms) from a reference time, and lasting for a certain duration, e.g., a period of 200 ms. Wireless communication unit 108 may reject the power save request and/or schedule a different power save period for wireless communication device 150. For example, in response to the request to schedule the sleep mode beginning within 5 ms and lasting for 200 ms, wireless communication unit 108 may schedule the power save mode within 8 ms from the reference time and/or for a period of 100 ms. Wireless communication unit 108 may transmit a power save mode response to wireless communication device 150 to cause wireless communication device 150 to switch to the power save mode for the scheduled time period, e.g., within 8 ms for a period of 100 ms. Wireless communication unit 108 may transmit a sleep mode update to base station 140, indicating to base station 140 of the sleep-mode periods scheduled for wireless communication device 150.

In some demonstrative embodiments, wireless communication unit 108 may manage the power-saving mechanism for wireless communication device 150 by scheduling one or more sleep-mode periods for wireless communication device 150. For example, wireless communication unit 108 may receive a sleep mode request from wireless communication device 150 and schedule one or more sleep-mode periods for wireless communication device 150, e.g., based on the sleep-mode request. For example, wireless communication unit 108 may determine that wireless communication device 150 should switch to the sleep mode for a scheduled sleep-mode period beginning at a certain time, e.g., within 10 ms from a reference time, and lasting for certain duration, e.g., a period of 200 ms. Wireless communication unit 108 may transmit a sleep mode response to wireless communication device 150 to cause wireless communication device 150 to switch to the sleep mode for the scheduled time period. Wireless communication unit 108 may transmit a sleep mode update to base station 140, indicating to base station 140 the sleep-mode periods scheduled for wireless communication device 150.

According to some embodiments, wireless communication unit 108 may manage the power-saving mechanism for wireless communication device 150 by scheduling one or more idle-mode periods for wireless communication device 150. For example, wireless communication unit 108 may receive an idle mode request from wireless communication device 150 and schedule one or more idle-mode periods for wireless communication device 150, e.g., based on the idle-mode request. For example, wireless communication unit 108 may determine that wireless communication device 150 should switch to the idle mode for a scheduled idle-mode period beginning at a certain time, e.g., within 200 ms from a reference time, and lasting for certain duration, e.g., a period of 10 seconds. Wireless communication unit 108 may transmit an idle mode response to wireless communication device 150 to cause wireless communication device 150 to switch to the idle mode for the scheduled time period. Wireless communication unit 108 may transmit an idle mode update to base station 140, indicating to base station 140 of the idle-mode periods scheduled for wireless communication device 150.

In some demonstrative embodiments, e.g., as described above, wireless communication unit 108 may manage the power-saving mechanism for wireless communication device 150 by scheduling one or more idle-mode periods for wireless communication device 150. However, in other demonstrative embodiments, the scheduling of the idle-mode periods may be performed by another device of system 100, e.g., relay device 104 and/or BS 140, and wireless communication unit 108 may relay, from the other device to wireless communication device 150, one or more scheduling messages indicating the scheduled idle-mode periods. For example, wireless communication unit 108 may receive an idle mode request, e.g., by an uplink transmission, from wireless communication device 150 wireless communication unit 108 may transfer the idle mode request to BS 140 and/or relay device 104; wireless communication unit 108 may receive an idle-mode response from BS 140 and/or relay device 104; and/or wireless communication unit 108 may transfer the idle-mode response to wireless communication device 150.

In some demonstrative embodiments, a wireless communication device, e.g., wireless communication device 150, operating at the idle-mode, may be allocated to at least one paging group. The paging group may include one or more base stations covering a zone ("paging zone" or "paging area") in which wireless communication device 150 is located In some demonstrative embodiments, different wireless communication devices may be allocated to one or more paging groups, e.g., defined according to an area covered by one or more base stations. In one example, wireless communication devices 150 and 152 may be located at first and second respective locations within first and second, different paging areas. The first and second paging areas may each include BS 140. Accordingly, BS 140 may allocate wireless communication device 150 to a first paging group, e.g., including base station 140 and one or more other base stations, covering the first paging area; while wireless communication device 152 may be allocated to a second paging group, e.g., including base station 140 and one or more other base stations, covering the second paging area. The first paging group may include, for example, one or more base stations, which do not belong to the first paging group.

In some demonstrative embodiments, BS 140 may assign wireless communication device 150 to a paging group, for example, before device 150 switches to the idle mode. Wireless communication device 150 may periodically "wake up" during a paging available interval of each paging cycle, e.g., by switching to a regular power mode.

In some demonstrative embodiments, a paging controller (PC) 130 may communicate with BS 140 to transfer paging parameters of the paging group, e.g., paging cycle and/or paging offset, to wireless communication device 150. According to some embodiments, BS 140 may transfer the paging parameters to relay device 102, which in turn may relay the paging parameters to wireless communication device 150.

In some demonstrative embodiments, BS 140 may assign relay device 102 to the same one or more paging groups BS 140 belongs to. Assigning relay device 102 to the same paging groups as BS 140 wireless communication device 150 may enable providing paging messages to wireless communication device 150, e.g., vie relay device 102, even when wireless communication device 150 is outside the coverage range of BS 140. This may be achieved by transmitting one or more page messages to relay device 102, which in turn may relay the page to wireless communication device 150.

In some demonstrative embodiments, while operating at the idle mode, wireless communication device 150 may alternate between a period of listening for paging messages (the "paging available interval" (PAI)), and a period during which wireless communication device 150 unavailable for receiving transmissions (the "paging unavailable interval" (PUI)).

In some demonstrative embodiments, PC 130 may initiate a paging process for paging wireless communication device 150, for example, when wireless communication device 150 is to be contacted during the idle-mode, e.g., when PC 130 has incoming data buffered for wireless communication device 150 and/or for any suitable administrative purposes.

In some demonstrative embodiments, PC 130 may initiate the paging process by transmitting a paging announcement to BS 140. BS 140, in turn, may transmit a paging announce message, e.g., a suitable Mobile Paging Advertisement (MOB-PAG-ADV) message, to relay device 102, e.g., in the form of a suitable unicast message addressed to relay device 102.

In some demonstrative embodiments, BS 140 may subsequently transmit the paging message to wireless communication device 150, e.g., in the form of a broadcast transmission, during the PAI.

In some demonstrative embodiments, relay device 102 may transmit the paging message to wireless communication device 150, e.g., in the form of a broadcast transmission. For example, relay device 102 and BS 140 may essentially simultaneously transmit the paging message to wireless communication device 150.

In some demonstrative embodiments, wireless communication unit 108 of relay device 102 may receive the paging announce message from PC 130, via BS 140, before the transmission of the paging message from BS 140 as part of the broadcast transmission.

As described above, in some demonstrative embodiments, system 100 may include a sequence of a plurality of relay devices, e.g., relay devices 102 and 104. According to these embodiments, the PC may transmit the paging announce message to a first relay device connected to the BS, for example, by transmitting the paging announce message via the BS; the relay device may transmit the paging announce message to a next relay device connected to the relay device, and so on, e.g., until the paging announce message reaches a relay device in direct communication with the wireless communication device; and the BS and/or each of the relay devices may broadcast the paging message. For example, PC 130 may transmit a paging announce message to BS 140, BS 140 may transmit the paging announcement to relay device 104, which in turn may transmit the paging announcement to relay device 102. BS 140, relay device 102 and relay device 104 may then each broadcast a paging message to be received by wireless communication device 150.

In some demonstrative embodiments, relay device 102 may perform the functionality of a preferred attachment point. For example, wireless communication device 150 may select relay device 102 as the preferred attachment point, e.g., as defined by the IEEE 802.16 standards.

In some demonstrative embodiments, transmitting the paging message during the PAI may enable wireless communication device 150 to receive the paging message, and to perform a network re-entry or a location update operation in response to the paging message.

In some demonstrative embodiments, wireless communication device 150 may exit a wireless network and/or re-enter the network at relay device 102, for example, by performing suitable network exit and/or re-entry procedures directly with relay device 102, e.g., instead of performing the network exit and/or re-entry procedures with BS 140.

In some demonstrative embodiments, PC 130 may maintain an indication of the paging group where wireless communication device 150 is initially located, e.g., before, during or after wireless communication device 150 enters into idle mode.

In some demonstrative embodiments, different wireless communication devices of system 100 operating at the idle mode may correspond to different PCs. Each PC may store information corresponding to one or more wireless communication devices operating at the idle mode. When wireless communication device 150 moves from one paging zone to another paging zone, wireless communication device 150 may update PC 130, via relay device 102, regarding the other paging zone. For example, when wireless communication device 150 moves away from a current paging group and enters a new paging group, wireless communication device 150 may send a Ranging Response (RNG-RSP) message with a location update message ("Location Update TLV" or "location update request"), to relay device 102. Relay device 102 may forward the RNG-RSP message with the Location update TLV to BS 140. BS 140 may communicate with PC 130 to complete the location update. BS 140 may send a Ranging Command (RNG-CMD) message to relay device 102, with the status of the location update process. Relay device 102 may receive the RNG-CMD message and relay the RNG-CMD message to wireless communication device 150.

Figure 2:
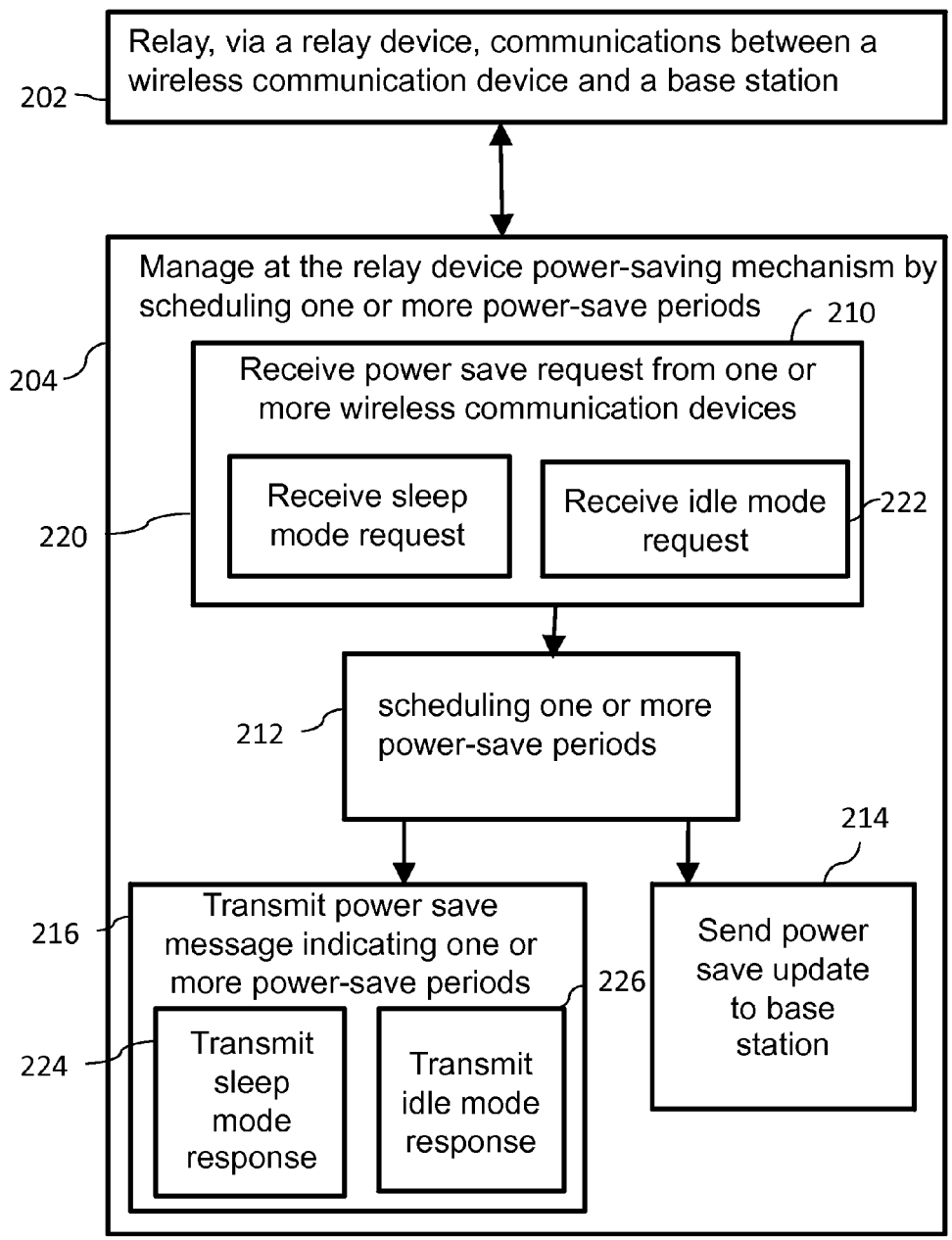
FIG. 2 is a schematic flow-chart illustration of a method of power saving for wireless communication, in accordance with some demonstrative embodiments.

Reference is now made to FIG. 2, which schematically illustrates a method of managing power saving mechanisms of wireless communication devices, in accordance with some demonstrative embodiments.

In some demonstrative embodiments, one or more of the operations of the method of FIG. 2 may be performed by a relay device, for example, relay device 102 (FIG. 1), a wireless communication unit, e.g., wireless communication unit 108 (FIG. 1), a base station, e.g., base station 140 (FIG. 1), and/or any other suitable wireless communication device.

As indicated at block 202, the method may include relaying, via a relay device, communications between a wireless communication device and a base station. For example, wireless communication unit 108 (FIG. 1) may relay communications between wireless communication devices 150 and/or 152 and base station 140.

As indicated at block 204, the method may include managing, at the relay device, a power-saving mechanism of the wireless communication device, e.g., by scheduling one or more power-save periods for wireless communication device.

The operation of block 204 may be executed before or after the operation of block 202. For example, according to one embodiment, wireless communication unit 108 (FIG. 1) may first relay transmissions between wireless communication device 150 (FIG. 1) and base station 140 (FIG. 1) and subsequently manage a power saving mechanism for wireless communication device 150 (FIG. 1). According to another embodiment, wireless communication unit 108 (FIG. 1) may first manage a power saving mechanism for wireless communication device 150 (FIG. 1), before relaying transmissions between wireless communication device 150 (FIG. 1) and base station 140 (FIG. 1).

As indicated at block 210, managing the power-saving mechanism may include receiving a power save request from the wireless communication device.

As indicated at block 220, receiving the power save request may include receiving a sleep mode request, e.g., as described above.

As indicated at block 222, receiving the power save request may include receiving an idle mode request, e.g., as described above.

As indicated at block 212, managing the power-saving mechanism may include scheduling one or more power-save periods. For example, as explained above, wireless communication unit 108 (FIG. 1) may accept or reject the request, or may schedule one or more alternative power-save periods, e.g., sleep or idle periods, to wireless communication device 150 (FIG. 1).

As indicated at block 216, managing the power-saving mechanism may include transmitting a power save message to the one or more wireless communication devices.

As indicated at block 224, transmitting the power save message may include transmitting a sleep mode response, e.g., as described above.

As indicated at block 226, transmitting the power save message may include transmitting an idle mode response, e.g., as described above.

As indicated at block 214, managing the power-saving mechanism may include transmitting a power-save update to a base station. For example, wireless communication unit 108 (FIG. 1) may transmit a power-save update to base station 140 (FIG. 1), e.g., to indicate the one or more power-save periods assigned to wireless communication device 150 (FIG. 1), e.g., as described above.

Figure 3:
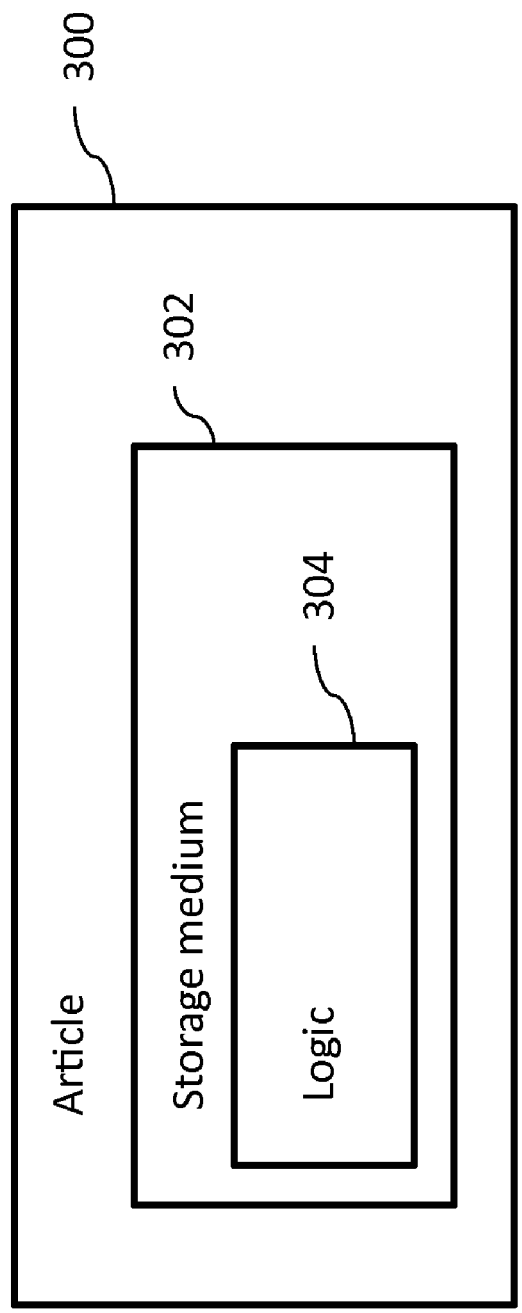
FIG. 3 is a schematic illustration of an article of manufacture, in accordance with some demonstrative embodiments.

Reference is made to FIG. 3, which schematically illustrates an article of manufacture 300, in accordance with some demonstrative embodiments. Article 300 may include a machine-readable storage medium 302 to store logic 304, which may be used, for example, to perform at least part of the functionality of wireless communication unit 108 (FIG. 1) and/or relay device 102 (FIG. 1); and/or to perform one or more operations of the method of FIG. 2.

In some demonstrative embodiments, article 300 and/or machine-readable storage medium 302 may include one or more types of computer-readable storage media capable of storing data, including volatile memory, non-volatile memory, removable or non-removable memory, erasable or non-erasable memory, writeable or re-writeable memory, and the like. For example, machine-readable storage medium 302 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 304 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 304 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device including:
a wireless communication unit to relay communications between a wireless communication device and a base station,
wherein the wireless communication unit is to manage a power-saving mechanism of the wireless communication device by scheduling one or more power-save periods for the wireless communication device, and transmitting to the wireless communication device a power-save message indicating the one or more power-save periods,
wherein the wireless communication unit is to receive a power-save request from the wireless communication device,
wherein the wireless communication unit is to process the power-save request and to determine whether to accept the power save request and schedule the power-save periods according to the power save request,
and wherein, in response to the power-save request, the wireless communication unit is to transmit a power-save response to the wireless communication device, the power-save response indicating the one or more power save periods scheduled by said wireless communication unit.

2. The device of claim 1, wherein the wireless communication unit is to receive the power-save request directly from the wireless communication device, and to transmit a power-save response directly to the wireless communication device.

3. The device of claim 1, wherein the power-save request includes a sleep-mode request, and wherein the power-save periods include sleep periods during which the wireless communication device is to operate at a sleep mode.

4. The device of claim 1, wherein the power-save request includes an idle-mode request, and wherein the power-save periods include idle periods during which the wireless communication device is to operate at an idle mode.

5. The device of claim 1, wherein the wireless communication unit is to transmit a power-save update to be received by the base station, the power-save update indicating the one or more power-save periods.

6. The device of claim 1, wherein the wireless communication unit is to receive an idle-mode initiation request from the wireless communication device, to relay the idle-mode initiation request to the base station, to receive from the base station an idle-mode initiation response including one or more idle-mode parameters defining one or more idle-mode paging periods, and to relay the idle-mode initiation response to the wireless communication device.

7. The device of claim 1, wherein the wireless communication unit is to be assigned to a same paging group as the base station, and to receive from the base station an announcement of a paging message, and wherein the wireless communication unit is to broadcast the paging message to the paging group.

8. The device of claim 7, wherein the wireless communication unit is to receive the announcement prior to a broadcast transmission of the paging message by the base station.

9. The device of claim 1, wherein the wireless communication unit is to receive from the wireless communication device a location update request to switch the wireless communication device between paging groups, and wherein the wireless communication unit is to relay the location update request to the base station.

10. A method including:
relaying, via a relay station, communications between a wireless communication device and a base station; and
managing at the relay station a power-saving mechanism of the wireless communication device by scheduling one or more power-save periods for the wireless communication device, and transmitting to the wireless communication device a power-save message indicating the one or more power-save periods,
wherein managing the power-saving mechanism includes receiving a power-save request from the wireless communication device, processing the power-save request to determine whether to accept the power save request and schedule the power-save periods according to the power save request, and transmitting a power-save response to the wireless communication device in response to the power-save request, the power-save response indicating the one or more power save periods.

11. The method of claim 10 including receiving an idle-mode initiation request from the wireless communication device, relaying the idle-mode initiation request to the base station, receiving from the base station an idle-mode initiation response including one or more idle-mode parameters defining one or more idle-mode paging periods, and relaying the idle-mode initiation response to the wireless communication device.

12. The method of claim 10 including transmitting a power-save update to be received by the base station, the power-save update indicating the one or more power-save periods.

13. The method of claim 10 including:
assigning the relay station to the same paging group as the base station;
receiving, at the relay station, an announcement of a paging message from the base station, prior to a broadcast transmission of the paging message by the base station; and
broadcasting the paging message from the relay station to the paging group.

14. The method of claim 10 including receiving, at the relay station, a location update request to switch the wireless communication device between paging groups, and relaying the location update request to the base station.

15. A wireless communication system including:
a wireless communication relay station to relay communications between a wireless communication device and a base station, the relay station including a wireless communication unit and one or more antennas,
wherein the wireless communication relay station is to manage a power-saving mechanism of the wireless communication device by scheduling one or more power-save periods for the wireless communication device, and transmitting to the wireless communication device a power-save message indicating the one or more power-save periods,
wherein the relay station is to receive a power-save request from the wireless communication device,
wherein the relay station is to process the power-save request and to determine whether to accept the power save request and schedule the power-save periods according to the power save request, and wherein, in response to the power-save request, the relay station is to transmit a power-save response to the wireless communication device, the power-save response indicating the one or more power save periods scheduled by said relay station.

16. The system of claim 15, wherein the wireless communication relay station is to receive an idle-mode initiation request from the wireless communication device, to relay the idle-mode initiation request to the base station, to receive from the base station an idle-mode initiation response including one or more idle-mode parameters defining one or more idle-mode paging periods, and to relay the idle-mode initiation response to the wireless communication device.

17. The system of claim 15, wherein the wireless communication relay station is to transmit a power-save update to be received by the base station, the power-save update indicating the one or more power-save periods.

18. The system of claim 15, wherein the wireless communication relay station is to be assigned to a same paging group as the base station, and to receive from the base station an announcement of a paging message, and wherein the wireless communication relay station is to broadcast the paging message to the paging group.

19. The system of claim 15, wherein the wireless communication relay station is to receive from the wireless communication device a location update request to switch the wireless communication device between paging groups, and wherein the wireless communication relay station is to relay the location update request to the base station.

* * * * *